US010543445B2

(12) United States Patent
Branzelle et al.

(10) Patent No.: US 10,543,445 B2
(45) Date of Patent: Jan. 28, 2020

(54) AIR FILTERING DEVICE

(71) Applicants: Wilhelmina Branzelle, North Dinwiddie, VA (US); Richard Branzelle, North Dinwiddie, VA (US)

(72) Inventors: Wilhelmina Branzelle, North Dinwiddie, VA (US); Richard Branzelle, North Dinwiddie, VA (US)

(*) Notice: Subject to any disclaimer, the term of this patent is extended or adjusted under 35 U.S.C. 154(b) by 369 days.

(21) Appl. No.: 15/647,508

(22) Filed: Jul. 12, 2017

(65) Prior Publication Data
US 2018/0015404 A1 Jan. 18, 2018

Related U.S. Application Data

(60) Provisional application No. 62/361,008, filed on Jul. 12, 2016.

(51) Int. Cl.
B01D 46/24 (2006.01)
B01D 46/00 (2006.01)
F24F 13/08 (2006.01)
F24F 13/28 (2006.01)

(52) U.S. Cl.
CPC ...... B01D 46/2411 (2013.01); B01D 46/0009 (2013.01); F24F 13/085 (2013.01); F24F 13/28 (2013.01); B01D 2279/50 (2013.01)

(58) Field of Classification Search
CPC .................................................. B01D 46/0005
See application file for complete search history.

(56) References Cited

U.S. PATENT DOCUMENTS

| 2,804,839 | A | 9/1957 | Hallinan | |
|---|---|---|---|---|
| 5,525,145 | A | 6/1996 | Hodge | |
| 6,623,540 | B2 | 9/2003 | Clayton et al. | |
| 7,416,577 | B2 * | 8/2008 | Simmons | B01D 46/0005 55/491 |
| 7,575,617 | B2 | 8/2009 | Ferguson | |
| 8,038,756 | B2 * | 10/2011 | Iddings | B01D 46/009 55/502 |
| 8,460,419 | B1 * | 6/2013 | Hobbs | B01D 46/2411 454/195 |
| 2006/0292978 | A1 | 12/2006 | Romanuik | |
| 2010/0263339 | A1 * | 10/2010 | Steins | B01D 46/0024 55/337 |

* cited by examiner

Primary Examiner — Amber R Orlando
(74) Attorney, Agent, or Firm — Global Intellectual Property Agency, LLC; Daniel Boudwin

(57) ABSTRACT

An air filtering device for indicating when to replace the internal filter of an HVAC system. The air filtering device includes a frame having a plurality of sidewalls each having an upper end and a lower end. Each sidewall contains a plurality of slits that cycle air therethrough. A filter member is affixed to the upper end of the plurality of sidewalls, wherein the upper end containing the filter member is closed and the lower end is opened. Magnetic fasteners are affixed to the lower end of the plurality of sidewalls, wherein the magnetic fasteners removably secure to an outer perimeter of a return vent, such that the filter member overlays the grill of the return vent. In an alternate embodiment, a magnetic support member is affixed to a lower surface of the filter member at an equidistance from opposing sidewalls to prevent the filter member from touching the grill.

11 Claims, 4 Drawing Sheets

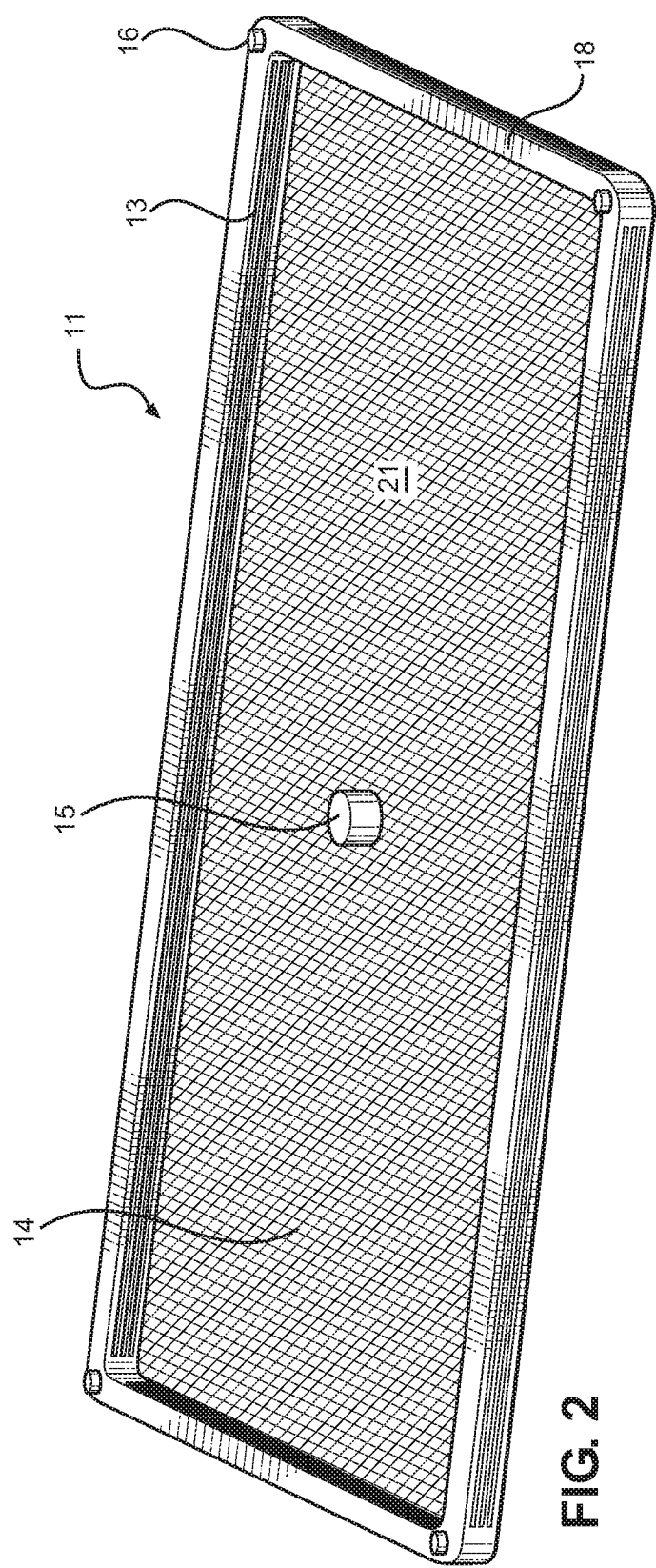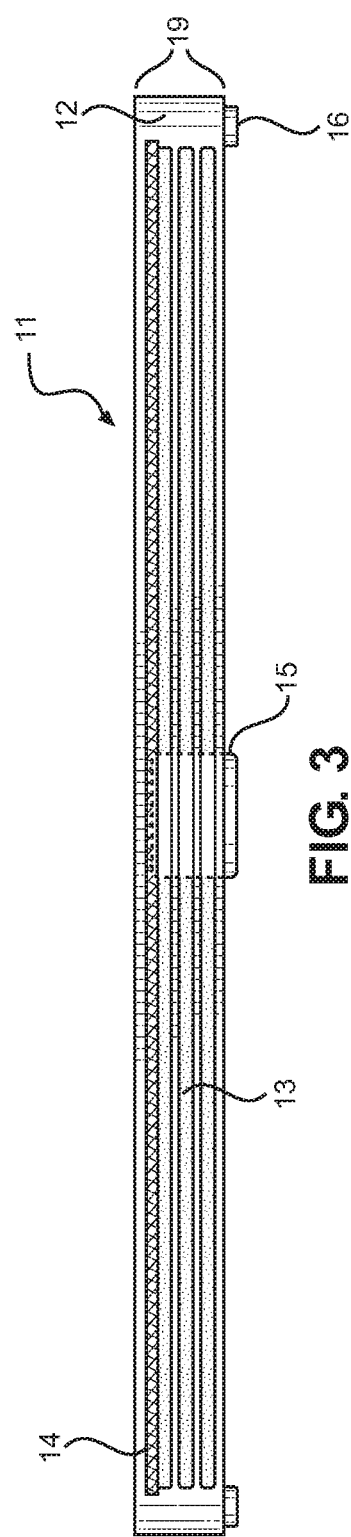

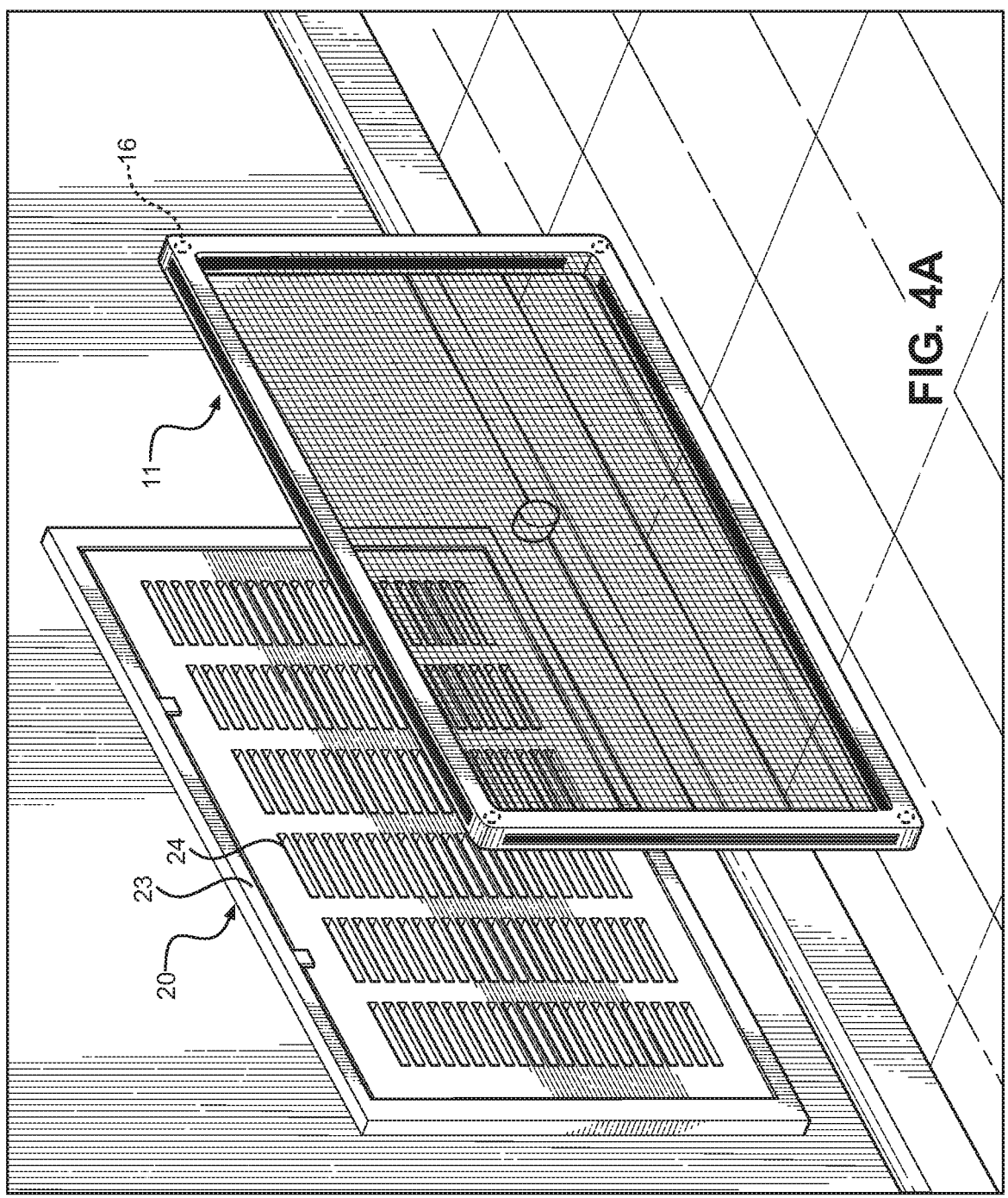

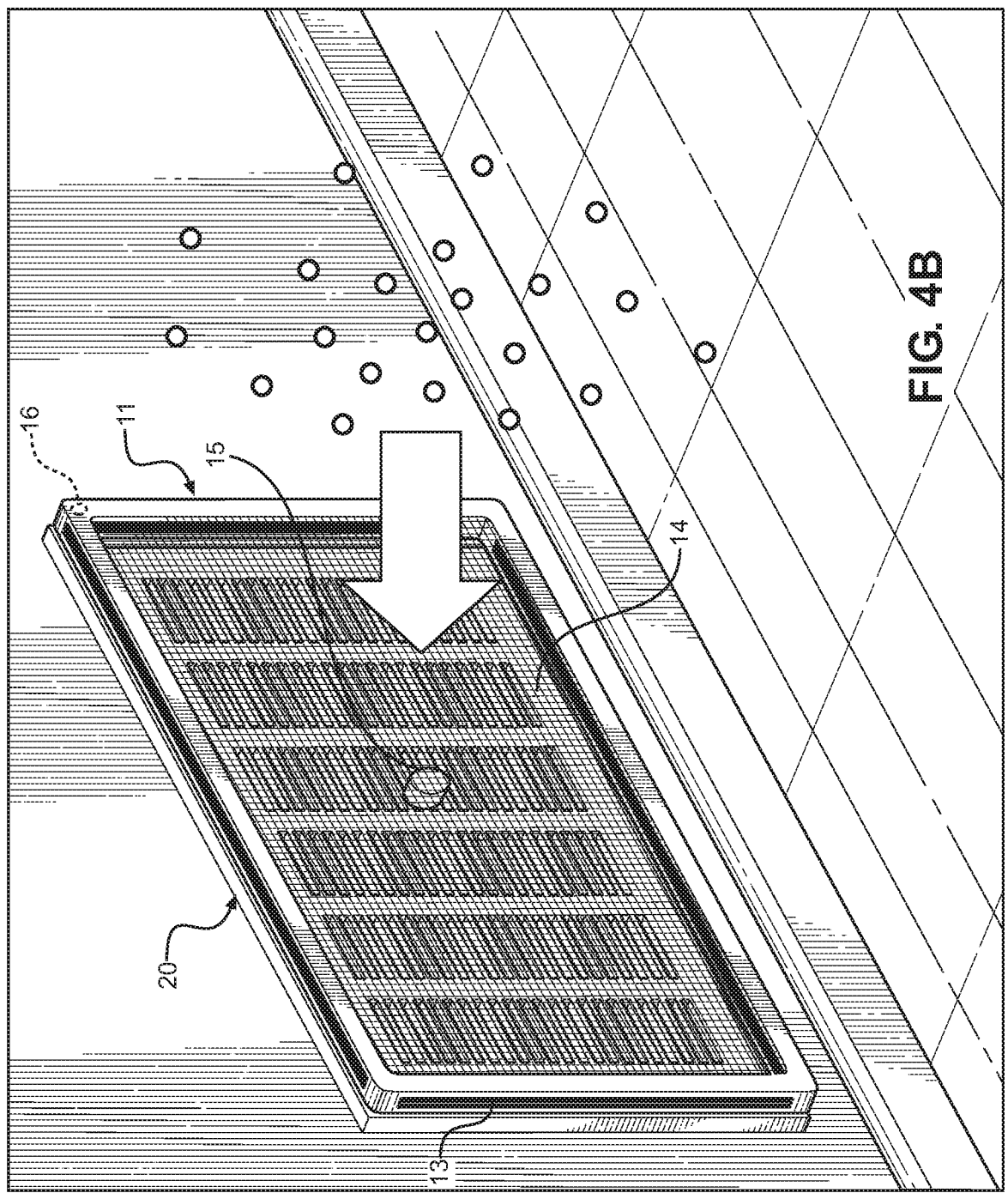

AIR FILTERING DEVICE

CROSS REFERENCE TO RELATED APPLICATION

This application claims the benefit of U.S. Provisional Application No. 62/361,008 filed on Jul. 12, 2016. The above identified patent application is herein incorporated by reference in its entirety to provide continuity of disclosure.

BACKGROUND OF THE INVENTION

The present invention relates to HVAC filters and return vents. More specifically, the present invention provides an air filtering device that is adapted to be removably secured to a return vent of a HVAC system in order to visually indicate when the internal filter of the HVAC system needs replacement and further provides a secondary means to filter air within a household.

Many heating, ventilation and air conditioning (HVAC) systems require the use of internal filters that need to be properly maintained. Dirt, dust, pet fur, and other debris can contaminate the filter, thereby reducing the air quality that passes through the internal filter. Additionally, when an internal filter becomes clogged with excessive dirt and debris, this restricts airflow and forces the HVAC system to work harder to cycle hot or cold air throughout a household. This increased workload can eventually cause the HVAC system to wear out prematurely. Therefore, it is advantageous to constantly check, maintain, and clean or replace the internal filters of an HVAC system. Accordingly, a device configured to provide a visual reminder to replace the internal filter of a HVAC system is desired.

Devices have been disclosed in the prior art that relate to secondary filters and return vent grills. These include devices that have been patented and published in patent application publications. These devices generally relate to secondary filters or indicators such as filtering apparatuses for forced air duct grills, air filter alarm systems, and magnetic return vent grill assemblies.

These known art devices have several drawbacks. Many of these devices lack slits on the sidewalls of the filter housing, capable of allowing air to continue to cycle through the return vent, even when the filter of the device is clogged. Some of these secondary air filtering devices are placed within the vents of the HVAC system, where it would be difficult to visually see the buildup of dust and particles indicating the internal filter needs to be changed. Some of these devices lack a magnetic fastening means wherein the filter is easily attached and detached from the return vent of an HVAC system. While others, including a magnetic means to attach a grill cover to a return vent, lack a secondary filter. Finally, these known devices lack a support member, attached to the filter, that prevents the filter material from touching the grill of the return vent.

In light of the devices disclosed in the known art, it is submitted that the present invention substantially diverges in design elements from the known art and consequently it is clear that there is a need in the art for an improvement to existing secondary filter devices. In this regard the instant invention substantially fulfills these needs.

SUMMARY OF THE INVENTION

In view of the foregoing disadvantages inherent in the known types of secondary filters now present in the known art, the present invention provides a new air filtering device wherein the same can be utilized for providing convenience for the user by indicating when the internal filter of the HVAC system needs replacement and further filtering air prior to entering the return vent of an HVAC system.

It is therefore an object of the present invention to provide a new and improved air filtering device that has all of the advantages of the known art and none of the disadvantages.

It is another object of the present invention to provide an air filtering device comprising a frame having a plurality of sidewalls wherein each sidewall has an upper end and a lower end. Each sidewall of the plurality of sidewalls contains a plurality of slits located between the upper end and lower end of the plurality of sidewalls, such that each slit is configured to cycle air therethrough. A filter member affixed to the upper end of the plurality of sidewalls, wherein the upper end containing the filter member is closed and the lower end is opened. A plurality of fasteners affixed to the lower end of the plurality of sidewalls, configured to removably secure the lower end to an outer perimeter of a return vent, such that the filter member overlays a grill of the return vent.

Another object of the present invention is to provide an air filtering device wherein the plurality of fasteners are magnets and the frame is substantially rectangular Yet another object of the present invention is to provide a support member that is affixed to a lower surface of the filter member at an equidistance from opposing sidewalls of the plurality of sidewalls, wherein the support member is configured to prevent the filter member from touching the return vent grill. The support member extends from the upper end to the lower end of the sidewalls and has a circular shape. In another embodiment, the support member is a magnet configured to secure to the grill of the return vent.

Another object of the present invention is to provide an air filtering device that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 2 shows a perspective view of the bottom of the air filtering device.

FIG. 3 shows a side view of the air filtering device.

FIG. 4A and FIG. 4B show perspective views of the air filtering device in a detached position and an attached position, respectively.

DETAILED DESCRIPTION OF THE INVENTION

Figure 1:
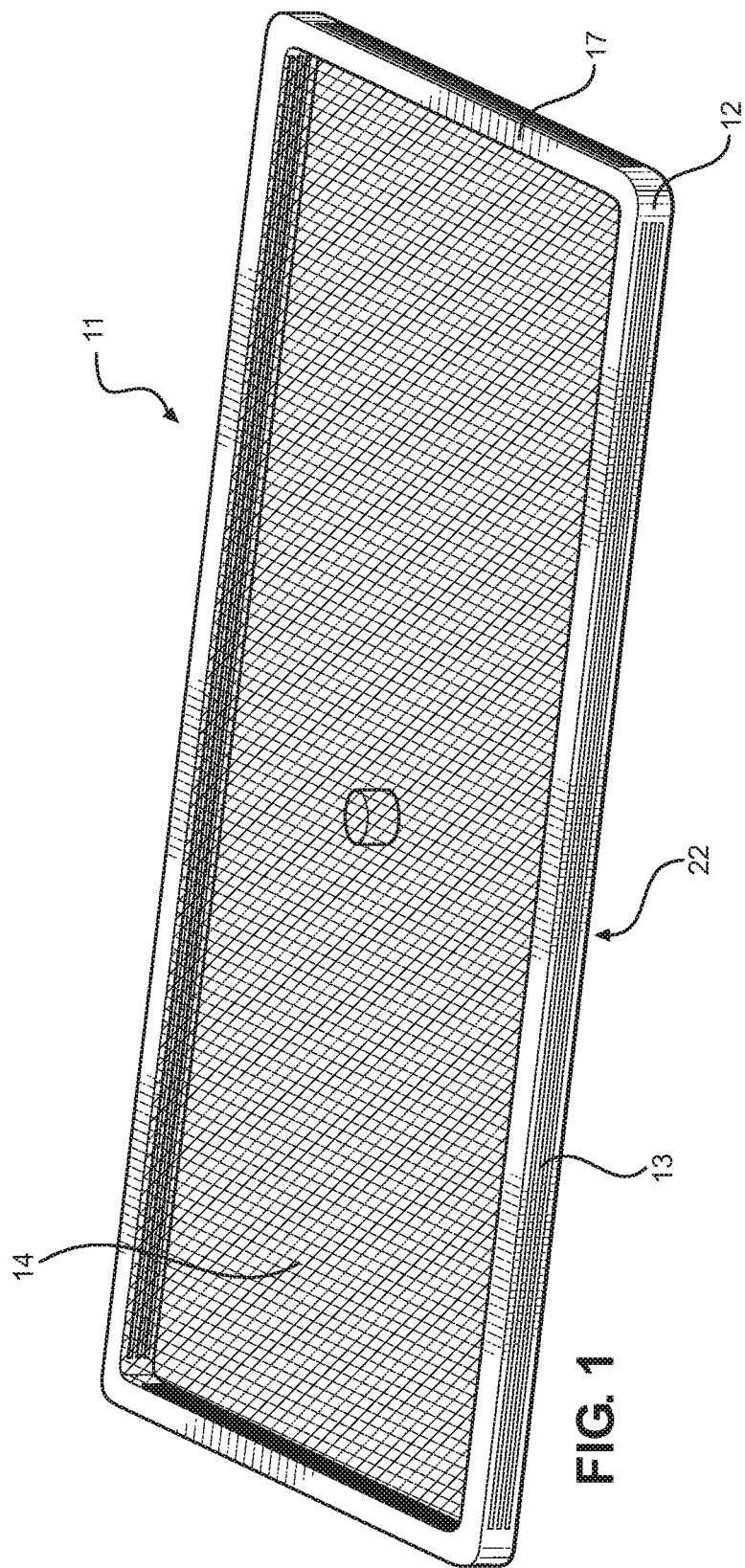
FIG. 1 shows a perspective view of the top of the air filtering device.

Reference is made herein to the attached drawings. Like reference numerals are used throughout the drawings to depict like or similar elements of the air filtering device. For the purposes of presenting a brief and clear description of the present invention, the preferred embodiment will be discussed as used for visually indicating that an internal filter of a HVAC system needs replacement while further providing a secondary air filtering means when positioned on a return vent. The figures are intended for representative purposes only and should not be considered to be limiting in any respect.

Referring now to FIG. 1 and FIG. 2, there are shown perspective views of the top and the bottom of the air filtering device, respectively. The air filtering device 11 comprises a frame 22 having a plurality of sidewalls 12 wherein each sidewall 12 has an upper end 17 and a lower end 18. In the illustrated embodiment, the frame 22 of the device 11 is substantially rectangular with rounded corners and constructed of a rigid material, such as plastic. In alternative embodiments, the frame 22 can be made of any rigid material, such as steel, aluminum, or cardboard. In the illustrated embodiment, the frame is a composed of a uniform material, such that the frame is a unitary structure.

Each sidewall 12 contains a plurality of slits 13 located between the upper end 17 and lower end 18 of the sidewall 12, such that each slit 13 is configured to cycle air therethrough. In the illustrated embodiment, the slits 13 are disposed in parallel with a longitudinal axis of the frame 22 and extend the entire length of a sidewall 12, not including the corners of the frame 22. The length is designed to maximize the amount of air that can be cycled through each of the slits 13 in the event of a blockage of the device 11.

A filter member 14 is affixed to the upper end 17 of the plurality of sidewalls 12, thereby creating an interior volume between the filter member 14 and the plurality of sidewalls 12, wherein the upper end 17 of the sidewalls 12 containing the filter member 14 is closed and the lower end 18 is opened. In the illustrated embodiment, the upper surface of the filter member 14 is flush with the upper end 17 of the sidewalls 12. The filter member 14 is made of a suitable air filtering material, such as nylon, wherein the air filtering material extracts dust and dirt particles from the air and is further configured to be washable.

The air filtering device 11 further includes a plurality of fasteners 16 affixed to the lower end 18 of the sidewalls 12, configured to removably secure to an outer perimeter of a return vent, such that the filter member 14 overlays a grill of the return vent and none of the lower end 18 of the plurality of sidewalls 12 covers the grill. In the illustrated embodiment, the plurality of fasteners 16 are magnets 16. The magnets 16 produce a magnetic force that is attracted to a ferrous metal within the return vent, thereby allowing the magnets 16 to removable secure to the outer perimeter of the return vent. A user can easily remove the device 11 from the return vent by applying an opposing force to the magnetic force of the magnets 16. In the illustrated embodiment, a fastener 16 is disposed at each corner of the frame 12.

Referring now to FIG. 2. and FIG. 3, there is shown a perspective view of the bottom of the air filtering device and a side view of the air filtering device, respectively. In the illustrated embodiment, the air filtering device 11 contains a support member 15 that is affixed to a lower surface 21 of the filter member 14, wherein the height of the support member 15 extends from the upper end 17 of the frame to the lower end 18 of the sidewalls. The support member 15 is configured to prevent the filter member 14 from touching the grill of the return vent when in an attached position. In the illustrated embodiment, the support member 15 is affixed to the lower surface 21 of the filter member 14 at an equidistance from opposing sidewalls of the plurality of sidewalls 12. In alternative embodiments, the support member 15 can be affixed at any position on the lower surface 21 of the filter member 14. In the illustrated embodiment, the support member is a circular shape, but this is not meant to limit the shape to this embodiment. In another embodiment, the support member 15 is a magnet, configured to removably secure to the grill of the return vent.

In the illustrated embodiment, the sidewalls 12 of the device are configured with a width 19 wide enough to accommodate three slits 13. In alternative embodiments, the sidewalls can be any width 19 and the number of slits 13 can vary based on performance of the filter member 14. If the filter member 14 regularly becomes clogged because of dust particles in the air, more slits 13 are necessary to allow air to continue to cycle through a HVAC system when the airflow through the filter member 14 is restricted.

Referring now to FIG. 4A and FIG. 4B, there are shown perspective views of the air filtering device in a detached position and an attached position, respectively. In the illustrated embodiment, the air filtering device 11 is in an attached position when the magnets 16 are removably secured to the outer perimeter 23 of the return vent 20, wherein the filter member 14 overlays the grill 24 of the return vent 20 and none of the frame covers the grill 24. When in the attached position, the air filtering device 11 remains secure on the return vent 20 and filters out any dust particles heading back through the return vent 20. The user can visually inspect the filter member of the device 11 and once the filter member 14 is full of dust particles or other debris, this is an indication that the air filtering device 11 and the internal filter of the HVAC system needs to be replaced or cleaned. Once the filter member 14 becomes full of dust, a user can easily detach the device 11 from the return vent by applying an opposing force to the magnetic force.

In the illustrated embodiment, the air filtering device 11 is equipped with the support member 15 and a plurality of slits 13 positioned on the sidewalls. When the filter member becomes clogged with dust or debris, the support member 15 prevents the filter member 14 from touching and blocking the grill 24 of the return vent 20, while the slits 13 allow air to continue to flow through the HVAC system even with the clogged filter. This configuration allows the HVAC system to continue to cycle the air within a house even when the air filtering device 11 is clogged, thereby reducing the stress on the HVAC system.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An air filtering device, comprising:
   a frame having a plurality of sidewalls, wherein each sidewall has an upper end and a lower end;
   wherein each sidewall contains a plurality of slits located between the upper end and lower end, such that each slit is configured to allow air to cycle therethrough;
   a filter member affixed to the upper end of the plurality of sidewalls, wherein the upper end containing the filter member is closed and the lower end is opened; and
   a plurality of fasteners affixed to the lower end of the plurality of sidewalls, configured to removably secure the lower end of the sidewalls to an outer perimeter of a return vent, such that the filter member overlays a grill of the return vent.

2. The air filtering device of claim 1, wherein the plurality of fasteners are magnets.

3. The air filtering device of claim 1, wherein a support member is affixed to a lower surface of the filter member, configured to prevent the filter member from touching the grill of the return vent.

4. The air filtering device of claim 3, wherein the support member is affixed to the lower surface of the filter member at an equidistance from opposing sidewalls of the plurality of sidewalls.

5. The air filtering device of claim 3, wherein the support member extends from the upper end to the lower end of the sidewalls.

6. The air filtering device of claim 3, wherein the support member is a magnet configured to removably secure to the grill of the return vent.

7. The air filtering device of claim 1, wherein the filter member is made of nylon.

8. The air filtering device of claim 1, wherein the frame is made of plastic.

9. The air filtering device of claim 1, wherein the frame is substantially rectangular.

10. The air filtering device of claim 1, wherein the plurality of slits are disposed in parallel with a longitudinal axis of the frame.

11. The air filtering device of claim 1, wherein the filter member and the upper end are flush with one another.

\* \* \* \* \*